(12) United States Patent
Hayashida et al.

(10) Patent No.: US 7,235,292 B2
(45) Date of Patent: *Jun. 26, 2007

(54) ARTICLE WITH COMPOSITE HARD COAT LAYER AND METHOD FOR FORMING COMPOSITE HARD COAT LAYER

(75) Inventors: Naoki Hayashida, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 310 days.

This patent is subject to a terminal disclaimer.

(21) Appl. No.: 10/503,130

(22) PCT Filed: Feb. 17, 2003

(86) PCT No.: PCT/JP03/01672

§ 371 (c)(1),
(2), (4) Date: Aug. 10, 2004

(87) PCT Pub. No.: WO03/071315

PCT Pub. Date: Aug. 28, 2003

(65) Prior Publication Data

US 2005/0095432 A1    May 5, 2005

(30) Foreign Application Priority Data

Feb. 22, 2002    (JP) .............................. 2002-046135

(51) Int. Cl.
*B32B 27/06*    (2006.01)
*B32B 27/16*    (2006.01)
*B32B 27/26*    (2006.01)
*C08J 7/18*    (2006.01)

(52) U.S. Cl. ...................... 428/336; 428/413; 428/414; 428/421; 428/447; 428/500; 427/487; 427/496; 427/508; 427/386

(58) Field of Classification Search ................ 428/817, 428/64.4, 64.6, 65.8, 336, 411.1, 413, 414, 428/421, 447, 500, 487, 496, 508, 386
See application file for complete search history.

(56) References Cited

U.S. PATENT DOCUMENTS 4,223,069 A * 9/1980 Berghmans ................. 428/324
5,580,633 A * 12/1996 Kuwahara et al. ........ 428/825.1

FOREIGN PATENT DOCUMENTS

| JP | 6-211945 | 8/1994 |
| JP | 9-100111 | 4/1997 |
| JP | 9-137117 | 5/1997 |
| JP | 11-60235 | 3/1999 |
| JP | 2000-111713 | 4/2000 |
| JP | 2000-301053 | 10/2000 |
| JP | 2001-187812 | 7/2001 |
| JP | 2001-281414 | 10/2001 |

* cited by examiner

*Primary Examiner*—Ramsey Zacharia
(74) *Attorney, Agent, or Firm*—Oblon, Spivak, McClelland, Maier & Neustadt, P.C.

(57) ABSTRACT

The present invention provides inexpensively an article with a hard coat excellent in anti-staining property, lubricity, scratch resistance and abrasion resistance. The present invention also provides a method for forming the hard coat. A hard coat agent composition comprising a cationic polymerization curing compound is applied onto a surface of an article (1) to be hard-coat-treated, thereby forming a hard coat agent composition layer, a surface material layer is formed by film-forming with a surface layer material comprising a cationic polymerization curing compound having anti-staining property and/or lubricating property on a surface of the hard coat agent composition layer, and active energy rays are irradiated onto the formed hard coat agent composition layer and surface material layer, or the both layers are heated so as to cure the both layers simultaneously, thereby forming a hard coat layer (2) contacting the surface of the article (1) and an anti-staining surface layer (3) contacting the surface of the hard coat layer (2).

14 Claims, 1 Drawing Sheet

ARTICLE WITH COMPOSITE HARD COAT LAYER AND METHOD FOR FORMING COMPOSITE HARD COAT LAYER

TECHNICAL FIELD

The present invention relates to an article with a composite hard coat layer, and a method for forming a composite hard coat layer. In the present invention, a composite hard coat layer includes a hard coat layer which is formed on a surface of an article and has scratch resistance and abrasion resistance, and an anti-staining surface layer which is formed on the surface of the hard coat layer and has anti-staining property and lubricity. More specifically, the present invention relates to an article having, on a surface thereof, a composite hard coat layer having anti-staining property, lubricity, scratch resistance and abrasion resistance in the field of various articles for which these properties are required, and a method for forming the composite hard coat layer.

In particular, the present invention concerns a method for forming a composite hard coat layer having anti-staining property, lubricity, scratch resistance and abrasion resistance on a surface of an optical recording medium, a magneto-optical recording medium, an optical lens, an optical filter, an anti-reflection film, or any one of various display elements such as a liquid crystal display, a CRT display, a plasma display and an EL display, without deteriorating these optical property and recording property, and also concerns an article on which the hard coat layer is formed.

BACKGROUND ART

Usually, a protective layer (hard coat layer) is given to the surface of various articles for which scratch resistance and abrasion resistance are required, for example, optical recording media such as a CD (Compact Disk) and a DVD (Digital Versatile Disk), magneto-optical recording media, an optical lens, an optical filter, an anti-reflection film, and various display elements such as a liquid crystal display, a CRT display, a plasma display and an EL display.

In many cases, stains such as a finger print, sebum, sweat and cosmetics are adhered to the surface of these articles by user's use of the articles. Once such stains are adheres thereto, they are not easily removed. This is a serious problem, in particular, for optical recording media or optical lenses used to record or reproduce the media since the recording and reproducing of information signals are remarkably obstructed by the adhered stains.

In magneto-optical recording media, a magnetic head runs on an organic protective layer formed on their recording layer. Accordingly, it is required that the abrasion resistance of the protective layer is made high and, simultaneously, the frictional coefficient thereof is made low.

As the method for solving the former problem, suggested are various methods of forming, on the surface of an optical lens or the like, a layer having a nature that stains do not adhere easily to the layer and even if stains adhere to the layer, the stains are easily wiped off, that is, a layer having anti-staining property. Specifically, the following method is adopted in many cases: a method of forming a layer made of a fluorine-based compound or a silicone-based compound on the surface to give water repellency and oil repellency to the surface, thereby improving the anti-staining property.

About the method for overcoming the latter problem, that is, the method for decreasing the frictional coefficient of the surface of a protective layer (hard coat layer), many measures have been suggested so far. Specifically, the following method is used in many cases: a method of forming, on the surface of the protective layer, a film made of a liquid lubricant such as a fluorine-based polymer (for example, perfluoropolyether) or a silicone-based polymer (for example, polydimethylsiloxane), thereby improving lubricity.

Originally, the former anti-staining property and the latter lubricity are entirely different properties. However, it is common to the two that a fluorine-based compound or a silicone-based compound is used as means for giving each of these properties in many cases. Accordingly, problems common to the two are frequently caused when a fluorine-based compound or a silicone-based compound is used to give anti-staining property or lubricity to the surface of a hard coat.

Many fluorine-based compounds or silicone-based compounds are soft. Thus, when these compounds are used, it is very difficult to obtain a sufficient abrasion resistance. In order to overcome such a problem, the following method can be considered: a method of adding an inorganic filler made of $SiO_2$ fine particles or the like to a fluorine-based polymer or silicone-based polymer matrix to make the abrasion resistance high. According to such a method, however, a little improvement is made but a satisfactory abrasion resistance cannot be obtained as far as the fluorine-based polymer or silicone-based polymer is used as the matrix, wherein the inorganic filler is dispersed.

Therefore, the following method is considered: a method of making a protective layer into a lamination structure composed of two or more different layers, making the lower layer into a layer made of a highly hard material, and forming an upper layer made of a fluorine-based compound or silicone-based compound on the surface thereof, thereby giving anti-staining property or lubricity. In this case, it is preferable to make the upper layer, which is made of the fluorine-based compound or silicone-based compound, as thin as possible so as to reflect the hardness of the lower layer in the upper layer, which constitutes the topmost surface of the lamination protective layer. However, in this method, it is very difficult to obtain close adhesion between the lower layer and the upper layer which is made of the fluorine-based compound or silicone-based compound.

As the method for solving the above-mentioned problem about the adhesion, for example, the following method is known: a method of forming a lower layer made of an inorganic material such as $SiO_2$ by such a process as sputtering or sol-gel process; forming, on the surface of the lower layer, an upper layer made of alkoxysilane having fluoroalkyl group by such a process as vapor deposition or solution application; subjecting the resultant to heat treatment in the presence of a very small amount of water content so as to cause dehydration condensation between silanol groups generated by hydrolysis of the alkoxysilane and/or between the silanol groups and hydroxyl groups present in the surface of the lower layer made of $SiO_2$ or the like, whereby the upper layer is fixed onto the lower layer surface through chemical bonds and/or hydrogen bonds.

In this method, it is desired that the lower layer surface has active groups such as hydroxyl groups at a high density. Therefore, the material that can be used in the lower layer is limited to an inorganic compound, in particular, a metal oxide or a metal chalcogenide such as $SiO_2$, $Al_2O_3$, $TiO_2$ or ZnS. Even when the lower layer is made of a metal oxide such as $SiO_2$, in order to make adhesion between this metal oxide and the alkoxysilane of the upper layer sufficient, it is necessary to subject the lower layer surface to activating treatment, such as alkali treatment, plasma treatment or corona discharge treatment, for increasing the density of active groups on the surface before the formation of the upper layer.

An attempt is also made for using a lower layer made of an organic material such as polyethylene, polycarbonate or polymethyl methacrylate; making the surface of the lower layer hydrophilic by such a method as plasma treatment or corona discharge treatment; and forming an upper layer made of the same alkoxysilane as described above on the surface of the lower layer. In this case, however, the adhesion is far poorer than in the case that the above-mentioned inorganic material is used as the lower layer. Thus, a sufficient durability is not obtained.

In the case that a substrate to be hard-coat-treated is made of resin, according to the above-mentioned method in which an inorganic material such as $SiO_2$ is used as the lower layer, it is very difficult to obtain the abrasion resistance of the hard coat. When the layer made of the inorganic material such as $SiO_2$ is formed on the surface of the resin substrate, the thickness of the film which can be formed is at most about several hundred nanometers. It is difficult from the standpoint of the production process thereof to make the film thickness larger than such a value. Even if such a film can be formed, the inorganic film self-breaks easily since a difference in elastic modulus or thermal expansion coefficient between the inorganic film and the substrate is remarkably large. It is however difficult that the inorganic film having a thickness of several hundred nanometers gives a sufficient abrasion resistance. It is also difficult to obtain a sufficient adhesion between the resin substrate and the inorganic film. Consequently, the inorganic film is easily peeled. From this viewpoint, it is difficult to obtain a sufficient abrasion resistance, as well.

Therefore, in the case that the substrate to be hard-coat-treated is made of resin, it is necessary to form a primer layer having a high elastic modulus on the resin substrate, form a lower layer made of the same inorganic film as described above on the primer layer, thereby keeping the adhesion between the resin substrate and the inorganic film and the strength of the inorganic film, subject the surface of the lower layer to activating treatment, and form an upper layer made of the same fluorine-based alkoxysilane as described above on the lower layer surface. Since it is necessary to form the three layers successively in this way, the productivity is very poor.

Japanese Laid-open Patent Publication No. 9-137117 (1997) discloses a method of applying, onto a surface of a resin substrate, a composition comprising a polymerizable compound having in the molecule thereof at least two (meth)acryloyloxy groups and inorganic compound fine particles such as silica fine particles; photo-polymerizing and curing the polymerizable compound by irradiation of active energy rays; subjecting the surface of this cured film to corona treatment or plasma treatment; and then applying, onto the treated surface, a silane compound having in the molecule thereof at least one group which can generate silanol group by hydrolysis, thereby forming a silane compound coat having an improved adhesion to the above-mentioned cured film. In this case, in order to keep the adhesion between the silane compound coat as the upper layer and the cured film as the lower layer, it is likewise necessary to subject the cured film surface to corona treatment or plasma treatment.

In the case that about a protective layer of the above-mentioned magneto-optical recording medium a liquid lubricant such as perfluoropolyether or polydimethylsiloxane is applied onto the surface of an organic protective layer to form a lubricant film, the adhesion between the organic protective layer and the liquid lubricant film may not be considered very much since the lubricant is a viscous liquid. However, there is a possibility in that the lubricant is Decreased by sliding a magnetic field modulating head repeatedly for a long term or the lubricant volatilizes little by little in storage of the recording medium over a long term. In this method, therefore, it is desirable that the lubricant is firmly fixed on the organic protective layer surface.

Meanwhile, in order to obtain anti-staining property, it is necessary to give water repellency or oil repellency to the surface of a protective layer, as described above. However, this manner is not necessarily sufficient. The operation of wiping off adhering stains is generally carried out by users. Therefore, in order that users can feel that the operation of wiping off stains is easy at the time of carrying out this operation, it is necessary to decrease the frictional coefficient of the protective layer surface. Relationship between the anti-staining property of an article and the frictional coefficient thereof has hardly been pointed out so far. In reality, however, in order to give anti-staining property, it is essential to make the frictional coefficient low as well as give water repellency and oil repellency.

By making the frictional coefficient of the surface low, an impact caused when a hard projection contacts the surface can be slipped away; therefore, the generation of scratches can be suppressed. Accordingly, from the standpoint of improving the scratch resistance of the hard coat, it is required to make the frictional coefficient of the surface low, as well.

Japanese Laid-open Patent Publication Nos. 6-211945 (1994) and 2000-301053 disclose the formation of a hard coat layer by: applying, onto a substrate, a composition wherein fluoroalkyl acrylate and an acrylic monomer incompatible with this are dissolved at a given ratio in a solvent capable of dissolving the two; and irradiating electron rays onto the composition immediately after the application so as to cure the composition. According to these publications, by the application of the composition into a thickness of 1 to 15 μm and the irradiation of the electron rays immediately after the application, the solvent is instantaneously vaporized. Additionally, the fluoroalkyl acrylate compound and the acrylic monomer are localized so that the composition is cured in the state that the fluoroalkyl acrylate is distributed unevenly in the surface of the coat.

However, according to the two publications, it is necessary to irradiate the electron rays onto the composition so as to cure the composition instantaneously after the application of the composition and before the uneven distribution based on the volatilization of the solvent because the composition containing the components incompatible with each other is used. Accordingly, the timing of irradiating the electron rays after the application is difficult and the method for the application is restricted very much. Coating methods in which the evaporation rate of the solvent is large, for example, spin coating cannot be used.

A most serious problem in the methods disclosed in the publications is that there is a high possibility in that since the solvent is vaporized at the same time when the electron rays are irradiated, the solvent in the cured coat cannot be completely removed. In the publications, it is not at all examined whether the solvent is completely removed from the cured coat or not. In the case that a very small amount of the solvent remains inside, no problem is caused immediately after the formation of the hard coat but there is a possibility in that the coat is cracked or peeled after the use of the article with the coat over a long term. The hardness also becomes insufficient. Thus, a warp of the substrate on which the hard coat is formed is apt to increase gradually.

In the method of vaporizing the solvent at the same time when the electron rays are irradiated, the cured coat is apt to have a porous structure. Thus, the hardness thereof is insufficient and, further, the optical property may deteriorate. Accordingly, even if no problem is caused in the case of applying this method to the production of familiar articles, it is difficult to apply the method to the production of articles for which a very high optical property is required, for example, an optical lens or an optical recording medium.

In short, a hard coat wherein anti-staining property, lubricity and abrasion resistance are simultaneously realized at high levels has never been known so far.

DISCLOSURE OF THE INVENTION

Object of the Invention

An object of the present invention is to solve the above-mentioned problems in the related art and provide inexpensively an article with a hard coat excellent in anti-staining property, lubricity, scratch resistance and abrasion resistance. An object of the present invention is also to provide a method for forming a hard coat excellent in anti-staining property, lubricity, scratch resistance and abrasion resistance inexpensively and easily.

SUMMARY OF THE INVENTION

The present inventors made eager investigation. As a result, the present inventors have found out that a hard coat layer having scratch resistance and abrasion resistance is cured/made on a surface of an article, and an anti-staining surface layer having anti-staining property and lubricity is cured/made on the surface of the hard coat layer simultaneously by irradiating active energy rays onto the both layers or heating the both layers, thereby forming a composite hard coat layer in which the anti-staining surface layer and the hard coat layer are firmly adhered to each other. Thus, the present invention has been made.

Thus, the present invention comprises the followings:

(1) An article with a composite hard coat layer comprising a hard coat layer on a surface of the article and an anti-staining surface layer on a surface of the hard coat layer, wherein the hard coat layer is made of a cured product of a hard coat agent composition comprising a cationic polymerization curing compound, the anti-staining surface layer is made of a cured product of a surface layer material comprising a cationic polymerization curing compound having anti-staining property and/or lubricating property, and the anti-staining surface layer is fixed on the hard coat layer. The words "is fixed" means that about the water repellency of the composite hard coat layer as described in Examples, for example, the contact angle of water on the hard coat surface is 85 degrees or more at both of the initial time and the time after a cloth is slid on the surface. If the anti-staining surface layer is not fixed, the contact angle of 85 degrees or more cannot be attained, in particular, after the sliding.

(2) The article with the composite hard coat layer according to (1), wherein the anti-staining surface layer has a thickness of 1 nm or more and 100 nm or less.

(3) The article with the composite hard coat layer according to (1) or (2), wherein the cationic polymerization curing compound comprised in the hard coat agent composition is a compound having at least one reactive group selected from the group consisting of cyclic ether group and vinyl ether group.

(4) The article with the composite hard coat layer according to any of (1) to (3), wherein the cationic polymerization curing compound comprised in the surface layer material is a compound having at least one reactive group selected from the group consisting of cyclic ether group and vinyl ether group.

(5) The article with the composite hard coat layer according to any of (1) to (4), wherein the cationic polymerization curing compound comprised in the surface layer material comprises a compound including a moiety having silicone-based and/or fluorine-based substituent, and including at least one reactive group selected from the group consisting of cyclic ether group and vinyl ether group.

(6) The article with the composite hard coat layer according to any of (1) to (5), wherein the hard coat agent composition and/or the surface layer material comprise(s) a cationic photoinitiator.

(7) The article with the composite hard coat layer according to any of (1) to (5), wherein the hard coat agent composition and/or the surface layer material comprise(s) a heat-polymerizable cationic curing agent.

(8) The article with the composite hard coat layer according to any of (1) to (7), wherein the hard coat agent composition and/or the surface layer material further comprise(s) an inorganic filler.

(9) A method for forming a composite hard coat layer comprising a hard coat layer and an anti-staining surface layer on a surface of an article, the method comprising the steps of:

applying a hard coat agent composition comprising a cationic polymerization curing compound onto a surface of an article to be hard-coat-treated, thereby forming a hard coat agent composition layer;

film-forming, on a surface of the hard coat agent composition layer, with a surface layer material comprising a cationic polymerization curing compound having anti-staining property and/or lubricating property, thereby forming a surface material layer; and irradiating active energy rays onto the formed hard coat agent composition layer and surface material layer, or heating the both layers, so as to cure the both layers simultaneously, thereby forming a hard coat layer contacting the surface of the article and an anti-staining surface layer contacting the surface of the hard coat layer.

(10) The method for forming the composite hard coat layer according to (9), wherein the anti-staining surface layer is formed to have a thickness of 1 nm or more and 100 nm or less.

(11) The method for forming the composite hard coat layer according to (9) or (10), wherein after the hard coat agent composition is applied onto the surface of the article, thereby forming the hard coat agent composition layer, the hard coat agent composition layer is dried to remove a solvent contained in the hard coat agent composition from the hard coat agent composition layer, and then the surface material layer is formed on the surface of the hard coat agent composition layer.

(12) The method for forming the composite hard coat layer according to (9) or (10), wherein after the hard coat agent composition is applied onto the surface of the article, thereby forming the hard coat agent composition layer, the hard coat agent composition layer is dried if necessary, the hard coat agent composition layer is irradiated with active energy rays, or is heated to turn the composition layer into a half-cured state, and then the surface material layer is formed on the surface of the hard coat agent composition layer.

(13) The method for forming the composite hard coat layer according to any of (9) to (12), wherein the surface material layer is formed by film-forming with the surface layer material by applying or depositing.

(14) The method for forming the composite hard coat layer according to (13), wherein at the time of film-forming by applying the surface layer material, there is used, as a solvent, a solvent in which the cationic polymerization curing compound in the already-formed hard coat agent composition layer is not substantially dissolved.

In the case that the surface material layer is formed by applying the surface layer material, the surface material layer is dried after the applying.

(15) The method for forming the composite hard coat layer according to any of (9) to (14), wherein the active energy rays are electron rays or ultraviolet rays.

(16) An article with a composite hard coat layer comprising a hard coat layer on a surface of the article and an anti-staining surface layer on a surface of the hard coat layer, wherein the article is obtained by applying a hard coat agent composition comprising a cationic polymerization curing compound onto a surface of an article to be hard-coat-treated, thereby forming a hard coat agent composition layer, film-forming, on a surface of the hard coat agent composition layer, with a surface layer material comprising a cationic polymerization curing compound having anti-staining property and/or lubricating property, thereby forming a surface material layer, and irradiating active energy rays onto the formed hard coat agent composition layer and surface material layer, or heating the both layers, so as to cure the both layers simultaneously, thereby forming a hard coat layer contacting the surface of the article and an anti-staining surface layer contacting the surface of the hard coat layer.

(17) The article with the composite hard coat layer according to any of (1) to (8) and (16), wherein the article is an optical recording medium, a magneto-optical recording medium, an optical lens, an optical filter, an anti-reflection film, or any one of various display elements. Examples of the display element include a liquid crystal display, a CRT display, a plasma display and an EL display.

In the description, the wording "a hard coat agent composition layer" means a hard coat layer which has not been cured or has been half-cured (i.e., has been partially cured). The wording "a surface material layer" means a surface layer, namely an anti-staining surface layer, which has not been cured.

MODES FOR CARRYING OUT THE INVENTION

Figure 1:
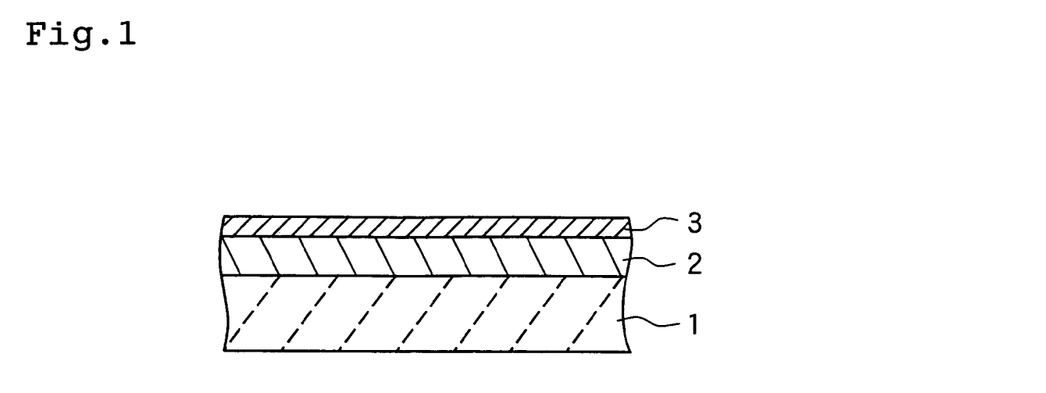
FIG. 1 is a sectional view which schematically illustrates an example of the layer structure of the article with a composite hard coat layer of the present invention.

The following describes the embodiment of the present invention in detail with reference to FIG. 1.

FIG. 1 is a sectional view which schematically illustrates an example of the layer structure of the article with a composite hard coat layer of the present invention. In FIG. 1, a hard coat layer (2) is formed on a surface of an article (1) to be hard-coat-treated, and an anti-staining surface layer (3) is formed to contact the surface of the hard coat layer (2). The combination of the hard coat layer (2) and the anti-staining surface layer (3) is referred to as the composite hard coat layer for the sake of convenience.

Examples of the article (1) include various objects for which hard coat treatment is necessary. Specific examples thereof include sheets or substrates made of a thermoplastic resin such as polyethylene terephthalate (PET), polymethyl methacrylate, polyethylene, polypropylene and polycarbonate. However, the article (1) is not limited to these examples. More specific examples of the article include an optical recording medium, a magneto-optical recording medium, an optical lens, an optical filter, an anti-reflection film, and various display elements such as a liquid crystal display, a CRT display, a plasma display and an EL display.

First, a hard coat agent composition containing a cationic polymerization curing compound is applied onto a surface of the article (1) so as to form a hard coat agent composition layer. Next, a surface material layer is formed by film-forming with a surface layer material containing a cationic polymerization curing compound having anti-staining property and/or lubricating property on the surface of the hard coat agent composition layer. The following describes respective components of the hard coat agent composition and the surface layer material.

The cationic polymerization curing compound contained in the hard coat agent composition is any compound having at least one reactive group selected from the group consisting of cyclic ether group and vinyl ether group. The structure of this compound is not particularly limited. The cationic polymerization curing compound preferably contains a polyfunctional monomer or oligomer containing, in the single molecule thereof, 2 or more, preferably 3 or more polymerizable groups in order to give a sufficient hardness to a hard coat by irradiation of active energy rays or by heating.

Among such cationic polymerization curing compounds, examples of the compound having cyclic ether group include those having epoxy group, alicyclic epoxy group, or oxetanyl group.

Specific examples of the compound having epoxy group include bisphenol A diglycidylether, novolac-type epoxy resins, trisphenol methane triglycidylether, 1,4-butanediol diglycidylether, 1,6-hexanediol diglycidylether, glycerin triglycidylether, trimethylolpropane triglycidylether, and propylene glycol diglycidylether.

Specific examples of the compound having alicyclic epoxy group include 2,4-epoxycyclohexylmethyl-3,4-epoxycyclohexanecarboxylate, bis(3,4-epoxycyclohexylmethyl)adipate, 2-(3,4-epoxycyclohexyl-5,5-spiro-3,4-epoxy) cyclohexanone-meta-dioxane, bis(2,3-epoxycyclopentyl) ether, and EHPE-3150 (alicyclic epoxy resin, manufactured by DAICEL CHEMICAL INDUSTRIES, LTD.).

Specific examples of the compound having oxetanyl group include 1,4-bis[(3-ethyl-3-oxetanylmethoxy)methyl] benzene, 1,3-bis[(3-ethyl-3-oxetanylmethoxy)methyl]propane, ethyleneglycol bis(3-ethyl-3-oxetanylmethyl)ether, trimethylolpropane tris(3-ethyl-3-oxetanylmethyl)ether, pentaerythritol tetrakis(3-ethyl-3-oxetanylmethyl)ether, dipentaerythritol hexakis(3-ethyl-3-oxetanylmethyl)ether, and ethylene oxide-modified bisphenol A bis(3-ethyl-3-oxetanylmethyl)ether.

Among the cationic polymerization curing compounds, specific examples of the compound having vinyl ether group include triethyleneglycol divinylether, tetraethyleneglycol divinylether, trimethylolpropane trivinylether, cyclohexane-1,4-dimethylol divinylether, 1,4-butanediol divinylether, polyester divinylether, and polyurethane polyvinylether.

The cationic polymerization curing compounds contained in the hard coat agent composition may be used alone or in combination of two or more thereof.

Alternatively, the hard coat agent composition may contain a radical polymerization curing compound, along with the aforementioned cationic polymerization curing compound. While such a radical polymerization curing compound may be any of those that include, within their molecules, more than one unsaturated double bond that takes part in radical polymerization, for example, preferred are the compounds having (meth)acryloyl group or vinyl group.

Among such radical polymerization curing compounds, examples of the compound having (meth)acryloyl group include, but are not limited to, trimethylolpropane tri(meth)acrylate, pentaerythritol tetra(meth)acrylate, dipentaerythritol hexa(meth)acrylate, triethyleneglycol di(meth)acrylate, and bis(2-hydroxyethyl)isocyanurate di(meth)acrylate.

Also, examples of the compound having vinyl group include, but are not limited to, divinylbenzene, ethyleneglycol divinylether, diethyleneglycol divinylether, and triethyleneglycol divinylether.

The radical polymerization curing compounds may be used in the hard coat agent composition either alone or in combination of two or more.

Preferably, the hard coat agent composition contains a known cationic photoinitiator or a known heat-polymerizable cationic curing agent. When the hard coat agent composition contains the cationic photoinitiator, it can be cured by irradiation with active energy rays (i.e., cationic photopolymerizability). When the hard coat agent composition contains the heat-polymerizable cationic-curing agent, it can be cured through the application of heat (i.e., cationic thermal-polymerizability).

Examples of the cationic photoinitiator include onium salts, such as diazonium salts, sulfonium salts, and iodonium salts. Aromatic onium salts are particularly preferred. Also preferred are iron-arene complexes such as ferrocene derivatives, and arylsilanol-aluminum complexes and the like. These cationic photoinitiators are properly selected. Among specific products of the cationic photoinitiators are CYRACURE UVI-6970, CYRACURE UVI-6974, and CYRACURE UVI-6990 (each manufactured by Dow Chemical, USA), IRGACURE 264 (manufactured by Ciba Specialty Chemicals Inc.), and CIT-1682 (manufactured by Nippon Soda). The amount of the cationic photoinitiator in the hard coat agent composition (as solid component) is for example in the range of from about 0.5 to about 5% by weight.

When the hard coat agent composition contains, in addition to the cationic polymerization curing compound, the radical polymerization curing compound, it is preferred that the hard coat agent composition contain a radical photo initiator along with the aforementioned cationic photoinitiator. Examples of such radical photo initiators include DAROCURE 1173, IRGACURE 651, IRGACURE 184, and IRGACURE 907 (each manufactured by Ciba Specialty Chemicals Inc.). The amount of the radical photo initiator in the hard coat agent composition (as solid component) is for example in the range of from about 0.5 to about 5% by weight.

Examples of the heat-polymerizable cationic curing agent include, but are not limited to, thermal latent curing agents, amine-based curing agents, acid anhydride curing agents, polyphenol-based curing agents, and polythiol-based curing agents.

The thermal latent curing agents are easy to handle and are thus the most preferred of the curing agents listed above. Examples of such thermal latent curing agents include organic acid hydrazides and amine imides, which react in an equimolar fashion, and amine salts and sulfonium salts of boron trifluoride, which react catalytically. Commercial products of the heat-polymerizable cationic curing agents, such as SAN-AID SI-60L (manufactured by Sanshin Chemical Industry), are available and are preferably used. The amount of the heat-polymerizable cationic curing agent in the hard coat agent composition (as solid component) is for example in the range of from about 0.5 to about 20% by weight.

If necessary, the hard coat agent composition may contain an inorganic filler in order to improve the abrasion resistance. Examples of the inorganic filler include silica, alumina, zirconia and titania. The average particle size of the inorganic filler is preferably 100 nm or less, more preferably 50 nm or less in the case that transparency is particularly necessary.

In order to enhance the strength and the abrasion resistance of the cured coat, the surface of the inorganic filler is preferably modified with a compound having an active energy ray polymerizable group. The inorganic filler which has an average particle size of 50 nm or less and is surface-modified with a compound having an active energy ray polymerizable group may be made of reactive silica particles described in, for example, Japanese Laid-open Patent Publication Nos. 11-60235 (1999), 9-100111 (1997) and 2001-187812. This filler is preferably used in the present invention. The silica particles described in Japanese Laid-open Patent Publication No. 11-60235 (1999) contain a cation-reactive oxetanyl group as a reactive group, and the silica particles described in Japanese Laid-open Patent Publication No. 9-100111 (1997) contain a radical-reactive (meth)acryloyl group as a reactive group. The silica particles described in Japanese Laid-open Patent Publication No. 2001-187812 contain both of a radical-reactive unsaturated double bond of a (meth)acryloyl group or the like, and a cation-reactive group of an epoxy group or the like. The addition of such an inorganic filler to the hard coat composition makes it possible that the abrasion resistance of the hard coat layer is made higher. The content by percentage of the inorganic filler is, for example, from about 5 to 80% by weight of the hard coat agent composition (as a solid content). If the content of the inorganic filler is more than 80% by weight, the film strength of the hard coat layer tends to become weak.

If necessary, the hard coat agent composition may further contain a non-polymerizable diluent, an organic filler, a polymerization inhibitor, an antioxidant, an ultraviolet ray absorber, a photo-stabilizer, an antifoamer, a leveling agent, a pigment, a silicon compound and others. Examples of the non-polymerizable diluent include isopropyl alcohol, n-butyl alcohol, methyl ethyl ketone, methyl isobutyl ketone, isopropyl acetate, n-butyl acetate, ethylcellosolve, and toluene.

The surface layer material is such that the film resulting from curing of the surface layer material would exhibit an anti-staining property and/or a lubricating property. Specifically, the cationic polymerization curing compound contained in the surface layer material may be of any structure as long as it can impart to the surface layer an anti-staining property (i.e., water repellency and/or oil repellency) and/or a lubricity and as long as it includes at least one reactive group selected from cyclic ether groups and vinyl ether groups that allow the surface layer material to undergo cationic polymerization upon irradiation with active energy rays or heating. For example, the cationic polymerization curing compound may be a silicone-based compound or a fluorine-based compound having cyclic ether and/or vinyl ether group.

Examples of the silicone-based compound include those compounds that include a moiety having a silicone-based substituent and at least one reactive group selected from cyclic ether groups and vinyl ether groups. Specific examples include, but are not limited to, compounds represented by the formulae (1), (2), and (3) shown below. For example, commercially available silicone compounds, such as those marketed as ultraviolet ray-curable silicone for release paper, may be suitably used. Among these commercially available ultraviolet ray-curable silicone products for release paper are TPR-6500, UV-9315, and XS56-A2982, each manufactured by GE Toshiba Silicones, and Silcolease UV system, manufactured by Rhodia, France. Any of these products may be preferably used.

(1)

(2)

(3)

wherein R is a substituent including at least one reactive group selected from cyclic ether groups and vinyl ether groups; n and m each represent a degree of polymerization; n is an integer of 5 to 1000; and m is an integer of 2 to 100.

Examples of the fluorine-based compound include those compounds that include a moiety having a fluorine-containing substituent and at least one reactive group selected from cyclic ether groups and vinyl ether groups. Specific examples include, but are not limited to, 3-(1H,1H-perfluorooctyloxy)-1,2-epoxypropane, 3-(1H,1H-perfluorononyloxy)-1,2-epoxypropane, 3-(1H,1H-perfluorodecyloxy)-1,2-epoxypropane, 3-(1H,1H-perfluoroundecyloxy)-1,2-epoxypropane, 3-(1H,1H-perfluorotetradecyloxy)-1,2-epoxypropane, 3-(1H,1H-perfluorohexadecyloxy)-1,2-epoxypropane, 1H,1H,6H,6H-perfluoro-1,6-hexanediol diglycidylether, 1H,1H,8H,8H-perfluoro-1,8-octanediol diglycidylether, 1H,1H,9H,9H-perfluoro-1,9-nonandiol diglycidylether, 1H,1H,10H,10H-perfluoro-1,10-decanediol diglycidylether, 1H,1H,12H,12H-perfluoro-1,12-dodecanediol diglycidylether, and Fomblin Z DOL diglycidylether (an alcohol-modified perfluoropolyether (manufactured by Ausimont Co.)). The compounds in which the reactive group is alicyclic epoxy group, such as 3,4-epoxycycdohexyl group, or vinyl ether group may also be preferably used.

The above-described silicone-based compounds and fluorine-based compounds to serve as the cationic polymerization curing compound may be used in the surface layer material either alone or in combination of two or more. Alternatively, the surface layer material may contain the cationic polymerization curing compound described with reference to the hard coat agent composition above and may optionally contain the radical polymerization curing compound.

When the hard coat agent composition contains the cationic photoinitiator, it is preferred that the surface layer material also contain the cationic photoinitiator. When the hard coat agent composition contains the heat-polymerizable cationic curing agent, it is preferred that the surface layer material also contain the heat-polymerizable cationic curing agent.

As with the hard coat agent composition, the surface layer material may also optionally contain a non-polymerizable diluent, an organic filler, an inorganic filler, a polymerization inhibitor, an antioxidant, an ultraviolet ray absorber, a photostabilizer, an antifoamer, a leveling agent, a pigment, or a silicon compound and others.

The hard coat agent composition and the surface layer material in accordance with the present invention can be prepared according to the foregoing description.

In the present invention, the above-mentioned hard coat agent composition is first applied onto the surface of the article (1) to form a hard coat agent composition layer. The coating method for the application is not limited, and may be any one of various coating methods such as spin coating, dip coating and gravure coating methods.

After the hard coat agent composition is applied onto the surface of the article (1) and before the film is formed with the surface layer material, it is preferable to remove the fluidity of the hard coat agent composition layer. The removal of the fluidity of the hard coat agent composition layer makes it possible to prevent a variation in the thickness of the hard coat agent composition layer or a deterioration in the surface smoothness thereof when the film is formed with the surface layer material on the composition layer. In this way, the surface layer material can easily be made into a uniform film.

To remove the fluidity of the hard coat agent composition layer, for example, when a diluent is present in the hard coat agent composition, it is advisable to dry, after the application of the composition, the applied layer so as to remove the solvent contained in the composition from the hard coat agent composition layer. Also, after the application and optional drying of the applied layer, it is allowable to irradiate active energy rays such as ultraviolet rays onto the layer when the hard coat agent composition contains a cationic photoinitiator, or heat the layer when the hard coat agent composition contains a heat-polymerizable cationic curing agent so as to turn the hard coat agent composition layer into a half-cured state. Care must be taken in controlling the conditions for active energy ray irradiation or heating so that the hard coat agent composition layer does not completely cure. The word "half-cured" means that a part of the applied hard coat agent composition has not yet reacted. Accordingly, the physical hardness of the hard coat agent composition layer is not limited. Thus, the tackiness of the surface is allowed to be lost. When the hard coat agent composition contains a cationic photoinitiator, the ultraviolet ray irradiation dose is for example in the range of from 1 to 500 mJ/cm$^2$, preferably in the range of from 1 to 200 J/cm$^2$, though it may vary depending on the thickness of the hard coat layer. The ultraviolet ray irradiation dose in this range is suitable for making the hard coat agent composition layer half-cured. When electron rays are irradiated, the electron ray irradiation dose is for example in the range of from 1 to 30 Mrad, preferably in the range of from 1 to 10 Mrad. The electron ray irradiation dose in this range is suitable for making the hard coat agent composition layer half-cured, though the amount of irradiation may vary depending on the type and amounts of the reactive groups in the used resins, the thickness of the layer, and the type of additives such as fillers. When the hard coat agent composition contains a heat-polymerizable cationic curing agent, the composition is preferably heated at 50 to 120° C. for about 5 to 60 min.

The thickness of the hard coat layer obtained by curing the hard coat agent composition layer is not particularly limited, and may be appropriately decided in accordance with the kind or the use of the article. In the case that the article is, for example, an optical recording disk, it is advisable to set the thickness into 1 μm or more and 10 μm or less, preferably 1 μm or more and 5 μm or less. If the thickness is less than 1 μm, a sufficient surface hardness cannot be given to the disk. If the thickness exceeds 10 μm, the disk tends to be cracked or largely warped.

Next, a surface material layer is formed by film-forming with the above-mentioned surface layer material on the surface of the hard coat agent composition layer which has not been cured or which has been partially cured (i.e., which is in the half-cured state). It is advisable to form the surface material layer in such a manner that the thickness of an anti-staining surface layer obtained after the surface material layer is cured will be made into 1 nm or more and 100 nm or less, preferably 5 nm or more and 50 nm or less. If the thickness is less than 1 nm, effects of anti-staining property and lubricity are not sufficiently obtained. If the thickness exceeds 100 nm, the hardness of the underlying hard coat layer is not sufficiently reflected. Thus, effects of scratch resistance and abrasion resistance decrease.

The film-forming can be conducted by the application or the deposition of the surface layer material. The surface layer material is applied by diluting the surface layer material with a suitable solvent and then applying the resultant coating solution by any one of various methods such as spin coating, dip coating, gravure coating, and spray coating methods. After the application, the resultant layer is dried.

It is preferred to use, as the solvent in this case, a solvent in which the cationic polymerization curing compound in the hard coat agent composition layer which has not been cured or has been partially cured is not substantially dissolved. It depends on not only the kind of the solvent but also the coating method whether or not the hard coat agent composition layer is substantially dissolved. In many cases in which as the coating method of the surface material layer, for example, spin coating is used, almost all of the diluent contained in the coating solution volatilizes when the spin coating is performed. Therefore, even if a solvent in which the hard coat agent composition layer is dissolved to some degree is used as the diluent, no practical problems are caused. In the case that as the coating method of the surface material layer, for example, dip coating is used, the hard coat agent composition layer surface which has not been cured contacts the surface material layer coating solution for a long time. It is therefore necessary to use a solvent in which the hard coat agent composition layer material is not at all dissolved or is hardly dissolved.

Examples of the solvent which can be used in dip coating include saturated hydrocarbons such as n-hexane, cyclohexane, n-octane and isooctane, silicon compounds such as hexamethyldisiloxane, octamethyltrisiloxane and octamethylcyclotetrasiloxane, and fluorocarbons such as perfluorohexane, perfluoroheptane and perfluorooctane. Examples of the solvent which can be used in spin coating include isopropyl alcohol, n-butyl alcohol, dibutyl ether, ethylcellosolve, butylcellosolve, methyl perfluorobutyl ether, ethyl perfluorobutyl ether, HFC 43-10mee, and 1,1,2,2,3,3,4-heptafluorocyclopentane besides the above-mentioned various solvents.

In this way, the hard coat agent composition layer which has not been cured or has been partially cured (i.e., which is in the half-cured state) and the surface material layer which is positioned on the surface thereof and has not been cured are formed.

Next, both the formed hard coat agent composition layer and surface material layer are simultaneously cured.

When the hard coat agent composition and/or the surface layer material contain(s) a cationic photoinitiator, the both layers are irradiated with active energy rays so as to be simultaneously cured. At this time, the active energy rays having an energy amount sufficient to cure the both layers completely are irradiated to complete the curing reaction of the both layers.

When both the hard coat agent composition layer and the surface material layer are durable by cationic photopolymerization, as the means for curing the both layers simultaneously, suitable means selected from active energy rays such as ultraviolet rays, electron rays, and visible rays may be used. However, in the present invention, to set the thickness of the anti-staining surface layer into a very small value, such as a value of 1 nm or more and 100 nm or less, preferably 5 nm or more and 50 nm or less and obtain better adhesion of the surface layer to the hard coat layer, it is necessary to use the curing method capable of exhibiting the good reactivity near the interface of the both layers. The cationic photopolymerizable layers are advantageous in that their curing process is not inhibited by oxygen. This eliminates the need to control the oxygen concentration in the atmosphere in which to carry out active energy ray irradiation, which is a necessary step in the radical polymerization system. Nonetheless, active species in the cationic photopolymerizable layers tend to lose their activities due to moisture, amine compounds, or alkali compounds present in the system. Thus, care must be taken to avoid contamination of the system with these components.

When ultraviolet rays are used to simultaneously cure the both layers, the ultraviolet ray irradiation dose is adjusted for example to the range of from 100 to 5000 mJ/cm$^2$, preferably to the range of 500 to 3000 mJ/cm$^2$. When electron rays are used, the electron ray irradiation dose is adjusted for example to the range of 1 to 50 Mrad, preferably to the range of 3 to 30 Mrad. The irradiation dose depends also on the type and amounts of the reactive groups in the used resins, the thickness of the layer, the type of additives such as fillers, and other factors, and thus must be properly adjusted. The accelerating voltage of the electron rays is, for example, from 20 to 200 kV. However, in an optical information medium comprising recording layer described later, the accelerating voltage is, for example, from 20 to 100 kV, preferably from 30 to 70 kV so as not to damage the recording layer.

When the hard coat agent composition and/or the surface layer material contain(s) a heat-polymerizable cationic curing agent, the both layers are heated so as to be simultaneously cured. At this time, an amount of heat sufficient to completely cure the both layers is applied to bring the curing reaction of the both layers to completion.

When the hard coat agent composition layer and the surface material layer are curable through cationic heat-polymerization, as the means for curing the both layers simultaneously, a hot air circulating furnace or a far-infrared panel heater may be used based on a standard method. The layers are preferably heated at 60 to 120° C. for about 15 to 180 min.

In the present invention, by curing, at the same time, the hard coat agent composition layer which has not been cured or has been partially cured (i.e., which is in the half-cured state) and the surface material layer which is formed to contact the surface thereof and has not been cured, the both layers are firmly adhered to each other in the interface therebetween. That is, the cured anti-staining surface layer (3) adhered firmly onto the cured hard coat layer (2) is obtained.

By use of such a process of the present invention, it is possible to form, on the high-hardness hard coat layer (2), the anti-staining surface layer (3) which is so thin as to reflect the hardness thereof on the topmost surface and is good in water repellency and lubricity and, further, it is possible to obtain good adhesion between the hard coat layer (2) and the anti-staining surface layer (3).

By use of such materials and such film-forming and film-curing methods, there is formed a composite hard coat layer which is excellent in abrasion resistance, water repellency and lubricity and is also good in persistence of these properties.

EXAMPLES

The present invention will be described more specifically by way of the following examples. However, the present invention is not limited to these examples.

Example 1

Photocation-curable Type

An ultraviolet ray-curable hard coat agent having a composition shown below was prepared and the composition obtained was applied onto a polycarbonate substrate (thickness: 0.6 mm, diameter: 12 cm) by spin coating. Thereafter, the resultant was heated at 60° C. in the atmosphere for 3 minutes, to remove the diluent in the coat. In this way, a hard coat layer which had not been cured was formed.

| (Composition for ultraviolet ray-curable hard coat agent) | |
|---|---|
| Glycidyl group-modified colloidal silica (Average particle size = 12 nm; dispersing medium: propylene glycol monomethyl ether, nonvolatile content = 30% by mass) | 50 parts by weight |
| Sorbitol polyglycidylether (PA36-PEP, manufactured by Yokkaichi Chemical Company) | 23 parts by weight |
| 1,6-hexanediol diglycidylether (manufactured by Yokkaichi Chemical Company) | 12 parts by weight |
| Photopolymerization initiator (bis(dodecylphenyl)iodonium hexafluoroantimonate, UV9380C, manufactured by GE Toshiba Silicones) | 2 parts by weight |
| Propyleneglycol monomethylether | 15 parts by weight |

Next, a surface layer material having a composition shown below was prepared and the composition obtained was then applied onto the above-mentioned hard coat layer which had not been cured by spin coating. The resultant was dried at 60° C. for 3 minutes to form a surface layer which had not been cured.

| (Composition for surface layer material) | |
|---|---|
| Alicyclic epoxy-modified silicone oil TPR6500 (manufactured by GE Toshiba silicones) | 1 part by weight |
| Photopolymerization initiator (bis(dodecylphenyl)iodonium hexafluoroantimonate, UV9380C, manufactured by GE Toshiba Silicones) | 0.03 part by weight |
| n-octane | 499 parts by weight |

The alicyclic epoxy-modified silicone oil included 3,4-epoxycyclohexyl group as are active group and had a viscosity of 300 cP at 25° C.

Next, ultraviolet rays were irradiated onto the surface layer in the atmosphere, thereby curing the hard coat layer and the surface layer simultaneously. Using a 160 W high-pressure mercury lamp as the light source, ultraviolet rays were irradiated to a total energy of 1.5 J/cm$^2$. The thickness of the hard coat layer was 2.5 μm, and the thickness of the surface layer was about 16 nm. The thickness of the hard coat layer was measured with a stylus profilometer. The thickness of the surface layer was measured by X-ray fluorescence analysis (XRF), using silicone oil (KF-96, manufactured by Shin-Etsu Chemical Co., Ltd.) as a standard material. In this way, the substrate with the composite hard coat layer was obtained.

Example 2

Photocation-curable Type

An ultraviolet ray-curable hard coat agent having a composition shown below was prepared and the composition obtained was applied onto a polycarbonate substrate (thickness: 0.6 mm, diameter: 12 cm) by spin coating. Thereafter, the resultant was heated at 60° C. in the atmosphere for 3 minutes, to remove the diluent in the coat. In this way, a hard coat layer which had not been cured was formed.

| (Composition for ultraviolet ray-curable hard coat agent) | |
|---|---|
| Solid alicyclic epoxy resin EHPE-3150 (manufactured by Daicel Chemical Industries) | 20 parts by weight |
| Tetrafunctional alicyclic epoxy resin EPOLEAD GT403 (manufactured by Daicel Chemical Industries) | 20 parts by weight |
| Bifunctional alicyclic epoxy resin UVR-6105 (manufactured by Dow Chemical Company) | 10 parts by weight |
| Photopolymerization initiator SILCOLEASE UV CATA211 (Diaryl iodonium tetrakis(pentafluorophenyl)borate, manufactured by Arakawa Chemical Industries) | 1.5 parts by weight |
| Propylene glycol monomethylether acetate | 50 parts by weight |

Next, a surface layer material having a composition shown below was prepared and the composition obtained was then applied onto the above-mentioned hard coat layer which had not been cured by spin coating. The resultant was dried at 60° C. for 3 minutes to form a surface layer which had not been cured.

(Composition for surface layer material)

| | |
|---|---|
| Alicyclic epoxy-modified silicone oil SILCOLEASE UV POLY201 (manufactured by Arakawa Chemical Industries) | 1 part by weight |
| Photopolymerization initiator SILCOLEASE UV CATA211 (Diaryl iodonium tetrakis(pentafluorophenyl)borate, manufactured by Arakawa Chemical Industries) | 0.03 part by weight |
| n-octane | 199 parts by weight |

Next, ultraviolet rays were irradiated onto the surface layer in the atmosphere, thereby curing the hard coat layer and the surface layer simultaneously. Using a 160 W high-pressure mercury lamp as the light source, ultraviolet rays were irradiated to a total energy of 1.5 J/cm². The thickness of the hard coat layer was 3.2 μm, and the thickness of the surface layer was about 40 nm. In this way, the substrate with the composite hard coat layer was obtained.

Example 3

Thermal Cation-curable Type

A heat-curable hard coat agent having a composition shown below was prepared and the composition obtained was applied onto a polycarbonate substrate (thickness: 0.6 mm, diameter: 12 cm) by spin coating. Thereafter, the resultant was heated at 60° C. in the atmosphere for 3 minutes, to remove the diluent in the coat. In this way, a hard coat layer which had not been cured was formed.

(Composition for heat-curable hard coat agent)

| | |
|---|---|
| Solid alicyclic epoxy resin EHPE-3150 (manufactured by Daicel Chemical Industries) | 20 parts by weight |
| Tetrafunctional alicyclic epoxy resin EPOLEAD GT403 (manufactured by Daicel Chemical Industries) | 20 parts by weight |
| Bifunctional alicyclic epoxy resin UVR-6105 (manufactured by Dow Chemical Company) | 10 parts by weight |
| Heat-polymerization initiator San-Aid SI-60L (manufactured by Sanshin Chemical Industry) | 1.5 parts by weight |
| Propyleneglycol monomethylether acetate | 50 parts by weight |

Next, a surface layer material having a composition shown below was prepared and the composition obtained was then applied onto the above-mentioned hard coat layer which had not been cured by spin coating. The resultant was predried at 60° C. for 3 minutes and was then heated at 120° C. for 2 hours to cure the hard coat layer and the surface layer simultaneously. The thickness of the hard coat layer was 3.0 μm, and the thickness of the surface layer was about 16 nm. In this way, the substrate with the composite hard coat layer was obtained.

(Composition for surface layer material)

| | |
|---|---|
| Alicyclic epoxy-modified silicone oil TPR6500 (manufactured by GE Toshiba silicones) | 1 part by weight |
| Heat-polymerization initiator San-Aid SI-60L (manufactured by Sanshin Chemical Industry) | 0.03 part by weight |
| n-octane | 499 parts by weight |

Comparative Example 1

An ultraviolet ray-curable hard coat agent having a composition shown below was prepared and the composition obtained was applied onto a polycarbonate substrate (thickness: 0.6 mm, diameter: 12 cm) by spin coating. Thereafter, the resultant was heated at 60° C. in the atmosphere for 3 minutes, to remove the diluent in the coat. Then, ultraviolet rays were irradiated in the atmosphere, thereby curing the hard coat layer. Using a 160 W high-pressure mercury lamp as the light source, ultraviolet rays were irradiated to a total energy of 1.5 J/cm².

(Composition for ultraviolet ray-curable hard coat agent)

| | |
|---|---|
| Glycidyl group-modified colloidal silica (Average particle size = 12 nm; dispersing medium: propylene glycol monomethyl ether, nonvolatile content = 30% by mass, manufactured by Catalysts & Chemicals IND. Co., LTD) | 50 parts by weight |
| Sorbitol polyglycidylether (PA36-PEP, manufactured by Yokkaichi Chemical Company) | 20 parts by weight |
| 1,6-hexanediol diglycidylether (manufactured by Yokkaichi Chemical Company) | 15 parts by weight |
| Photopolymerization initiator (bis(dodecylphenyl)iodonium hexafluoroantimonate, UV9380C, manufactured by GE Toshiba Silicones) | 2 parts by weight |
| Propyleneglycol monomethylether | 15 parts by weight |

Next, a surface layer material having a composition shown below was prepared and the composition obtained was then applied onto the above-mentioned hard coat layer which had been cured by spin coating. The resultant was dried at 60° C. for 3 minutes. Thereafter, ultraviolet rays were irradiated in the atmosphere, thereby curing the surface layer. Using a 160 W high-pressure mercury lamp as the light source, ultraviolet rays were irradiated to a total energy of 1.5 J/cm².

(Composition for surface layer material)

| | |
|---|---|
| Alicyclic epoxy-modified silicone oil TPR6500 (manufactured by GE Toshiba silicones) | 1 part by weight |
| Photopolymerization initiator (bis(dodecylphenyl)iodonium hexafluoroantimonate, UV9380C, manufactured by GE Toshiba Silicones) | 0.03 part by weight |
| n-octane | 499 parts by weight |

The alicyclic epoxy-modified silicone oil included 3,4-epoxycyclohexyl group as are active group and had a viscosity of 300 cP at 25° C. The thickness of the hard coat layer was 3.2 μm, and the thickness of the surface layer was about 14 nm. In this way, the substrate with the composite hard coat layer was obtained.

(Evaluation)

About the respective specimens produced in Examples 1 to 3 and Comparative Example 1, the following performance tests were made.

(1) Abrasion Resistance

A steel wool #0000 was used, and the wool was reciprocated 20 times so as to be slid onto the hard coat surface of each of the specimens under a load of 4.9N/cm². The degree of injuries generated at this time was judged with the naked eye. The criterion for the judgment was as follows:

○: No injuries were generated;
Δ: injuries were slightly generated; and
X: Injuries were generated.

(2) Water Repellency and Persistence thereof

The contact angle of water to the hard coat surface of each specimen was measured. The measurement was made at initial time and after the specimen surface was slid with a cloth impregnated with a solvent respectively. Conditions for the sliding were as follows: a nonwoven cloth (Bemcot Lint-free CT-8, manufactured by Asahi Kasei Co., Ltd.) was impregnated with acetone, and the cloth was reciprocated 50 times to be slid on the specimen surface under a load of 4.9 N/cm². The contact angle was measured at a temperature of 20° C. and a relative humidity of 60%, using a contact angle meter CA-D manufactured by Kyowa Interface Science Co., Ltd.

TABLE 1

|  | Abrasion resistance | Contact angle (degrees) | |
| --- | --- | --- | --- |
|  |  | Initial | After the sliding |
| Example 1 | ○ | 101.7 | 98.5 |
| Example 2 | ○ | 102.3 | 102.7 |
| Example 3 | ○ | 99.4 | 96.2 |
| Comparative Example 1 | ○ | 100.3 | 59.8 |

The results are shown in Table 1.

As can be seen from Table 1, each of the substrates with the respective hard coat layers of Examples 1 to 3 had a significantly high surface hardness, a high water repellency, and a high persistence thereof. In comparison, the substrate of Comparative Example 1, which used the same material as in Example 1, had lost its water repellency after the sliding with cloth, despite its relatively high initial water repellency. In Comparative Example 1, the adhesion of the surface layer to the hard coat layer was insufficient since the surface layer was formed after the hard coat layer had been cured.

Example 4

This example was a production example of an optical information medium with a composite hard coat layer (abbreviated to the optical disk). In this example, the produced optical disk was of a phase-change type. The present invention can be applied to various disks regardless of the kind of their recording layer. Thus, the present invention can be applied to not only this disk but also a read-only type optical disk, a write-once type optical disk or some other disk.

Figure 2:
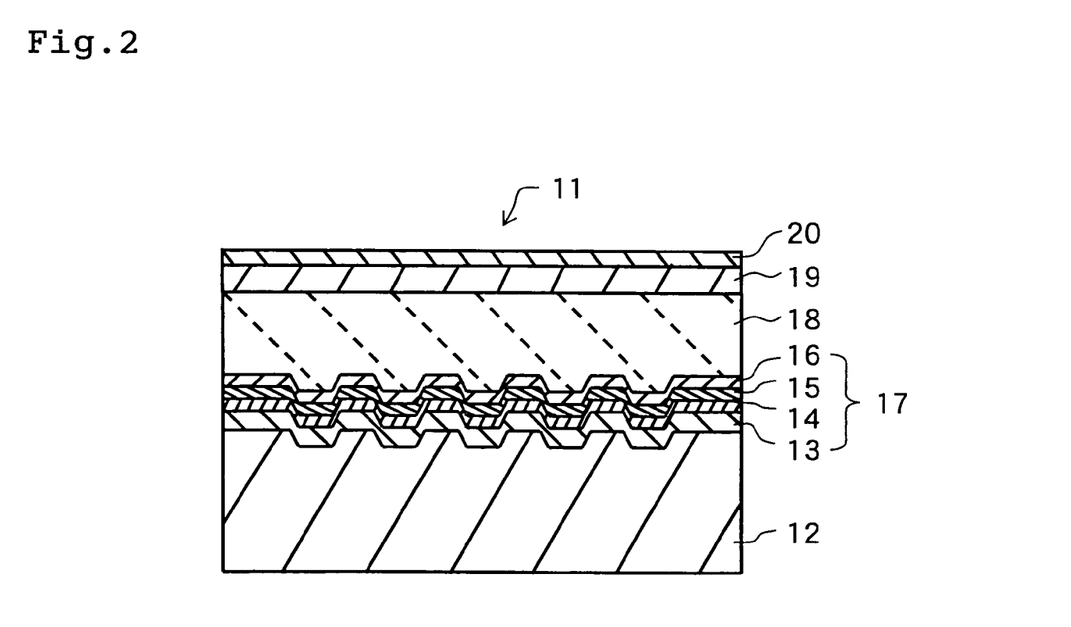
FIG. 2 is a schematic sectional view of an example of the optical disk with a composite hard coat layer of the present invention.

FIG. 2 is a schematic sectional view of an example of an optical disk with a composite hard coat layer. In FIG. 2, an optical disk (11) has, on a surface of a supporting substrate (12) in which fine concavities or convexities (such as information pits or pregrooves) are made, a reflecting layer (13), a second dielectric layer (14), a phase-change recording material layer (15), and a first dielectric layer (16) in this order. The disk (11) has a light-transmitting layer (18) on the first dielectric layer (16), and further has a hard coat layer (19) and an anti-staining surface layer (20) on the light-transmitting layer (18). In this example, the reflecting layer (13), the second dielectric layer (14), the phase-change recording material layer (15) and the first dielectric layer (16) constitute a recording layer (17). The combination of the hard coat layer (19) and the anti-staining surface layer (20) is referred to as the composite hard coat layer for the sake of convenience. The optical disk (11) is used in such a manner that a laser beam for recording or reproducing is introduced into the recording layer through the anti-staining surface layer (20), the hard coat layer (19) and the light-transmitting layer (18).

A sample of the optical disk having the layer structure illustrated in FIG. 2 was produced as follows.

The reflecting layer (13) made of $Al_{98}Pd_1Cu_1$ (atomic ratio) and having a thickness of 100 nm was formed on a surface of the disk-form supporting substrate (12) (made of polycarbonate, diameter: 120 mm, thickness: 1.1 mm), in which grooves for recording information were made, by sputtering. The depth of the grooves was $\lambda/6$ in an optical path length at wavelength $\lambda=405$ nm. The recording track pitch in a groove recording manner was set into 0.32 µm.

Next, an $Al_2O_3$ target was used to form the second dielectric layer (14) having a thickness of 20 nm on the surface of the reflecting layer (13) by sputtering. An alloy target made of a phase-change material was used to form the recording material layer (15) having a thickness of 12 nm on the surface of the second dielectric layer (14) by sputtering. The composition (atomic ratio) of the recording material layer (15) was set into $Sb_{74}Te_{18}(Ge_7In_1)$. A ZnS (80% by mole)-$SiO_2$ (20% by mole) target was used to form the first dielectric layer (16) having a thickness of 130 nm on the surface of the recording material layer (15) by sputtering.

Next, a radical-polymerizable ultraviolet ray-curable resin having the following composition was applied onto the surface of the first dielectric layer (16) by spin coating, and then ultraviolet rays were irradiated thereon so as to form the light-transmitting layer (18) in such a manner that the thickness thereof would be 98 µm after the layer (18) was cured.

| (Light-transmitting layer: Composition of ultraviolet ray-curable resin) | |
| --- | --- |
| urethane acrylate oligomer: (DIABEAM UK6035, manufactured by Mitsubishi Rayon Co., Ltd.) | 50 parts by weight |
| isocyanuric acid EO modified triacrylate: (ARONIX M315, manufactured by Toagosei Co., Ltd.) | 10 parts by weight |
| isocyanuric acid EO modified diacrylate: (ARONIX M215, manufactured by Toagosei Co., Ltd.) | 5 parts by weight |
| tetrahydrofurfuryl acrylate: | 25 parts by weight |
| photopolymerization initiator(1-hydroxycyclohexyl phenyl ketone): | 3 parts by weight |

Next, the same ultraviolet ray-curable hard coat agent composition as used in Example 2 was applied onto the light-transmitting layer (18) by spin coating, and then the resultant was heated at 60° C. in the atmosphere for 3 minutes to remove the diluent in the coat. In this way, the hard coat layer (19) which had not been cured was formed.

Next, the same surface layer material composition as used in Example 2 was applied onto the above-mentioned hard coat layer (19) which had not been cured by spin coating, and then the resultant was heated at 60° C. for 3 minutes. In this way, the surface layer (20) which had not been cured was formed.

Thereafter, ultraviolet rays were irradiated onto the surface layer in the atmosphere, thereby curing the hard coat layer (19) and the surface layer (20) simultaneously. Using a 160 W high-pressure mercury lamp as the light source, ultraviolet rays were irradiated to a total energy of 1.5 J/cm². The thickness of the hard coat layer was 3.0 µm, and the thickness of the surface layer was about 40 nm. In this way, the optical recording disk sample with the composite hard coat layer was obtained.

In the same manner as described above, the optical recording disk sample was evaluated for the abrasion resistance and the contact angle on the side having the composite hard coat layer. For the abrasion resistance, no scratches were formed on the surface of the disk sample, demonstrating that the disk is highly resistant to abrasion. The contact angle was initially 102.3 degrees and 102.7 degrees after the sliding with cloth, indicating that the disk retains high water repellency and persistence thereof.

In the above-mentioned example, the composite hard coat layer was given to the phase-change type optical disks. However, the present invention can be applied to read-only type optical disks or write-once type optical disks as well as optical disks having a phase-change type recording layer. The present invention can also be applied to not only optical information media but also optical lens, optical filters, anti-reflection films, and various display elements. Therefore, the above-mentioned working examples are merely examples in all points, and the present invention should not be restrictedly interpreted by the examples. Furthermore, all modifications belonging to a scope equivalent to that of the claims are within the scope of the present invention.

INDUSTRIAL APPLICABILITY

According to the present invention, an article with a hard coat, which has high abrasion resistance, good water repellency and lubricity, and significantly high durability, is inexpensively and easily provided.

The invention claimed is:

1. An article with a composite hard coat layer comprising a hard coat layer on a surface of the article and an anti-staining surface layer on a surface of the hard coat layer, wherein
the hard coat layer is made of a cured product of a hard coat agent composition comprising a cationic polymerization curing compound, wherein the cationic polymerization curing compound comprised in the hard coat agent composition is a compound having at least one reactive group selected from the group consisting of cyclic ether group and vinyl ether group,
the anti-staining surface layer is made of a cured product of a surface layer material comprising a cationic polymerization curing compound having anti-staining property and/or lubricating property, wherein the cationic polymerization curing compound comprised in the surface layer material is a compound having at least one reactive group selected from the group consisting of cyclic ether group and vinyl ether group and wherein the thickness of the anti-staining surface layer ranges from not less than 1 nm to not more than 100 nm, and
the anti-staining surface layer is fixed on the hard coat layer.

2. The article with the composite hard coat layer according to claim 1, wherein the cationic polymerization curing compound comprised in the surface layer material comprises a compound including a moiety having silicone-based and/or fluorine-based substituent, and including at least one reactive group selected from the group consisting of cyclic ether group and vinyl ether group.

3. The article with the composite hard coat layer according to claim 1, wherein the hard coat agent composition and/or the surface layer material comprise(s) a cationic photoinitiator.

4. The article with the composite hard coat layer according to claim 1, wherein the hard coat agent composition and/or the surface layer material comprise(s) a heat-polymerizable cationic curing agent.

5. The article with the composite hard coat layer according to claim 1, wherein the hard coat agent composition and/or the surface layer material further comprise(s) an inorganic filler.

6. The article with the composite hard coat layer according to claim 1, wherein the article is an optical recording medium, a magneto-optical recording medium, an optical lens, an optical filter, an anti-reflection film, or any one of various display elements.

7. A method for forming a composite hard coat layer comprising a hard coat layer and an anti-staining surface layer on a surface of an article, the method comprising the steps of:
applying a hard coat agent composition comprising a cationic polymerization curing compound onto a surface of an article to be hard-coat-treated, thereby forming a hard coat agent composition layer, wherein the cationic polymerization curing compound comprised in the hard coat agent composition is a compound having at least one reactive group selected from the group consisting of cyclic ether group and vinyl ether group;
film-forming, on a surface of the hard coat agent composition layer, with a surface layer material comprising a cationic polymerization curing compound having anti-staining property and/or lubricating property, thereby forming a surface material layer, wherein the cationic polymerization curing compound comprised in the surface layer material is a compound having at least one reactive group selected from the group consisting of cyclic ether group and vinyl ether group; and
irradiating active energy rays onto the formed hard coat agent composition layer and surface material layer, or heating the both layers, so as to cure the both layers simultaneously, thereby forming a hard coat layer contacting the surface of the article and an anti-staining surface layer contacting the surface of the hard coat layer, wherein the anti-staining surface layer is formed to have a thickness of 1 nm or more and 100 nm or less.

8. The method for forming the composite hard coat layer according to claim 7, wherein after the hard coat agent composition is applied onto the surface of the article, thereby forming the hard coat agent composition layer, the hard coat agent composition layer is dried to remove a solvent contained in the hard coat agent composition from the hard coat agent composition layer, and then the surface material layer is formed on the surface of the hard coat agent composition layer.

9. The method for forming the composite hard coat layer according to claim 7, wherein after the hard coat agent composition is applied onto the surface of the article, thereby forming the hard coat agent composition layer,
the hard coat agent composition layer is dried if necessary,
the hard coat agent composition layer is irradiated with active energy rays, or is heated to turn the composition layer into a half-cured state, and then
the surface material layer is formed on the surface of the hard coat agent composition layer.

10. The method for forming the composite hard coat layer according to claim 7, wherein the surface material layer is formed by film-forming with the surface layer material by applying or depositing.

11. The method for forming the composite hard coat layer according to claim 10, wherein at the time of film-forming by applying the surface layer material, there is used, as a solvent, a solvent in which the cationic polymerization curing compound in the already-formed hard coat agent composition layer is not substantially dissolved.

12. The method for forming the composite hard coat layer according to claim 7, wherein the active energy rays are electron rays or ultraviolet rays.

13. An article with a composite hard coat layer comprising a hard coat layer on a surface of the article and an anti-staining surface layer on a surface of the hard coat layer, wherein the article is obtained by applying a hard coat agent composition comprising a cationic polymerization curing compound onto a surface of an article to be hard-coat-treated, thereby forming a hard coat agent composition layer, wherein the cationic polymerization curing compound comprised in the hard coat agent composition is a compound having at least one reactive group selected from the group consisting of cyclic ether group and vinyl ether group, film-forming, on a surface of the hard coat agent composition layer, with a surface layer material comprising a cationic polymerization curing compound having anti-staining property and/or lubricating property, thereby forming a surface material layer, wherein the cationic polymerization curing compound comprised in the surface layer material is a compound having at least one reactive group selected from the group consisting of cyclic ether group and vinyl ether group and wherein the thickness of the anti-staining surface layer ranges from not less than 1 nm to not more than 100 nm, and irradiating active energy rays onto the formed hard coat agent composition layer and surface material layer, or heating the both layers, so as to cure the both layers simultaneously, thereby forming a hard coat layer contacting the surface of the article and an anti-staining surface layer contacting the surface of the hard coat layer.

14. The article with the composite hard coat layer according to claim 13, wherein the article is an optical recording medium, a magneto-optical recording medium, an optical lens, an optical filter, an anti-reflection film, or any one of various display elements.

* * * * *